(12) United States Patent
Feenstra (10) Patent No.: US 8,727,029 B2
(45) Date of Patent: May 20, 2014

(54) TRIM MANIFOLD ASSEMBLY FOR A SPRINKLER SYSTEM

(75) Inventor: Shawn J. Feenstra, Caledonia, MI (US)

(73) Assignee: The Viking Corporation, Hastings, MI (US)

(*) Notice: Subject to any disclaimer, the term of this patent is extended or adjusted under 35 U.S.C. 154(b) by 1192 days.

(21) Appl. No.: 12/556,919

(22) Filed: Sep. 10, 2009

(65) Prior Publication Data

US 2011/0056709 A1 Mar. 10, 2011

(51) Int. Cl.
| | | |
|---|---|---|
| *A62C 35/00* | (2006.01) | |
| *A62C 35/60* | (2006.01) | |
| *A62C 35/64* | (2006.01) | |
| *A62C 35/68* | (2006.01) | |
| *A62C 31/02* | (2006.01) | |
| *A62C 37/00* | (2006.01) | |
| *A62C 35/66* | (2006.01) | |
| *F16K 27/00* | (2006.01) | |
| *A62C 37/10* | (2006.01) | |

(52) U.S. Cl.
CPC ............ *A62C 35/605* (2013.01); *A62C 35/645* (2013.01); *A62C 35/68* (2013.01); *A62C 31/02* (2013.01); *A62C 37/00* (2013.01); *A62C 35/64* (2013.01); *A62C 35/66* (2013.01); *F16K 27/003* (2013.01); *A62C 37/10* (2013.01)
USPC ................... 169/16; 169/13; 169/17; 169/19; 169/22; 169/37; 169/61; 137/597

(58) Field of Classification Search
CPC .... A62C 35/605; A62C 35/345; A62C 35/68; A62C 35/58; A62C 31/02; A62C 37/10; A62C 37/00; A62C 37/40; A62C 35/60; A62C 35/64; A62C 35/66; F16K 27/003; B05B 1/14; B05B 15/00
USPC ............ 169/5, 13, 16, 19, 37, 56, 60, 61, 17, 169/22; 239/71, 565; 137/597, 861
See application file for complete search history.

(56) References Cited

U.S. PATENT DOCUMENTS

| | | | |
|---|---|---|---|
| 4,410,005 A | 10/1983 | Reip | |
| 4,911,201 A | 3/1990 | Nichols et al. | |
| 5,720,351 A * | 2/1998 | Beukema et al. | ............... 169/61 |
| 5,992,532 A | 11/1999 | Ramsey et al. | |
| 6,333,689 B1 | 12/2001 | Young | |
| 6,810,910 B2 * | 11/2004 | McHugh | ......................... 169/61 |
| 6,848,513 B2 | 2/2005 | Jackson et al. | |
| 7,185,711 B2 * | 3/2007 | Jackson et al. | ................... 169/16 |
| 2004/0011537 A1 | 1/2004 | Jackson et al. | |
| 2007/0114046 A1 | 5/2007 | Munroe | |
| 2007/0289751 A1 | 12/2007 | Feenstra et al. | |

* cited by examiner

*Primary Examiner* — Steven J Ganey
(74) *Attorney, Agent, or Firm* — Harness, Dickey & Pierce, P.L.C.

(57) ABSTRACT

A trim manifold assembly is utilized to facilitate control of the control valve in a fire protection system. The trim manifold assembly utilizes a manifold block with numerous passageways to provide desired flow communication between various components, such as automatic and manual valves, check valves, inlet and exit ports, and sensor ports, by way of non-limiting example. The trim manifold assembly can be cost-effectively manufactured and may require less assembly steps. The trim manifold assembly can facilitate the assembly of a fire protection system and the attachment of the trim manifold assembly to the control valve for operation thereof.

9 Claims, 12 Drawing Sheets

TRIM MANIFOLD ASSEMBLY FOR A SPRINKLER SYSTEM

FIELD

The present disclosure relates to fire protection systems and, more particularly, to a trim manifold assembly that controls the operation of the control valve of a sprinkler system for various fire protection systems.

BACKGROUND

This section provides background information related to the present disclosure which is not necessarily prior art.

Fire protection systems come in several forms. For example, deluge fire protection systems totally flood the protected area with pressurized fire suppressant, such as water by way of non-limiting example, with the system designed to empty until the control valve is closed by a release system, such as a hydraulic, pneumatic, electric, or manual release system. These deluge systems are often used in an area in which a fire may spread rapidly or in an area that contains combustible material, solutions, or the like. Other fire protection systems cycle between an actuated and non-actuated state and, in some cases, only deliver water to the effected area when activated by a heat sensor.

In some systems, the sprinkler system piping is filled with water prior to operation to permit a more rapid response. In other systems, the sprinkler piping is dry—these systems are primarily used to protect unheated structures where the system may be subject to freezing or in areas that are susceptible to water damage.

In each of these systems, the control valve that directs the flow of water to the sprinkler piping is controlled by a piping circuit or "trim piping." Trim piping varies depending on the type of system and, further, on the size of the valve. The trim piping may require over one hundred fittings that must be fastened together. The fittings can be expensive and the time to assemble the fittings adds cost to the sprinkler system. Additionally, the complexity of the trim piping may result in installation errors that can impair proper operation. Moreover, the trim piping can be cumbersome in size and weight such that use in tight spaces is inhibited and/or prohibited.

SUMMARY

This section provides a general summary of the disclosure, and is not a comprehensive disclosure of its full scope or all of its features.

A trim manifold assembly is utilized to facilitate control of the control valve in a fire protection system. The trim manifold assembly utilizes a manifold block with numerous passageways to provide desired flow communication between various components, such as automatic and manual valves, check valves, inlet and outlet ports, and sensor ports, by way of non-limiting example. The trim manifold assembly can be cost-effectively manufactured and may require less assembly steps. The trim manifold assembly can facilitate the assembly of a fire protection system and the attachment of the trim manifold assembly to the control valve for operation thereof.

A trim manifold assembly according to the present invention may be utilized with a fire protection system valve having an inlet in communication with a fire suppressant fluid supply line and an outlet in communication with sprinkler system piping. The trim manifold assembly may include a manifold block having a plurality of flow paths extending therethrough. A first one of the flow paths receives fire suppressant fluid in response to a fire condition. At least one port communicates with the first flow path and allows a fluid detection device to be coupled thereto to detect the presence of fire suppressant fluid in the first flow path. A second one of the flow paths communicates with the first flow path and receives fire suppressant fluid from the first flow path to be discharged to a discharge location.

The fire protection system valve may be responsive to a change in fluid pressure to control the flow of fire suppressant fluid from the fire suppressant fluid supply line to the sprinkler system piping. A third one of the flow paths of the manifold block may receive fire suppressant fluid from the fire suppressant supply line and supply the received fire suppressant fluid to a fluid pressure activated device. A fourth one of the flow paths may receive fire suppressant fluid to be discharged from at least one of the third flow path and the fluid pressure activated device. The fourth flow path discharges received fluid to a discharge location during a fire condition. Discharging received fluid through the fourth flow path changes a fluid pressure in the fluid pressure activated device and activates the fire protection system valve, causing fire suppressant to flow from the fire suppressant fluid line to the sprinkler system piping.

A trim manifold assembly according to the present invention may automatically maintain and discharge fluid pressure in a fluid pressure activated device. The trim manifold assembly may include a manifold formed from a single solid block. A first flow path extends through the manifold and receives a priming fluid from a fire suppressant fluid supply and directs the priming fluid to the fluid pressure activated device. A second flow path extends through the manifold and selectively receives priming fluid to be discharged to depressurize the fluid pressure activated device. A release mechanism may be external to the manifold and communicate with the first and second flow paths. The release mechanism may be responsive to a fire condition and allow flow communication between the first and second flow paths during a fire condition such that priming fluid in the first flow path is discharged through the second flow path and the fluid pressure activated device depressurized. A third flow path in the manifold communicates with an intermediate pressure chamber of a fire protection system valve and with the first flow path, with fire suppressant flowing into the intermediate pressure chamber when the fluid pressure activated device is depressurized. A pressure operated release valve may be disposed in the manifold in the third flow path and may selectively allow flow communication between the first and third flow paths based on a fluid pressure in the third flow path. A fourth flow path in the manifold may extend from the third flow path to the second flow path with fluid in the first and third flow paths flowing through the fourth flow path to the second flow path when the pressure operated release valve is open, thereby preventing a pressure buildup in the fluid pressure activated device.

A fire protection system according to the present invention includes a fire suppressant fluid supply, sprinkler system piping, a fire protection system valve, and a trim manifold assembly. The trim manifold assembly includes a manifold block having a plurality of flow paths extending therethrough. A first one of the flow paths receives fire suppressant fluid in response to a fire condition. At least one port communicates with the first flow path and allows a fluid detection device to be coupled thereto to detect the presence of fire suppressant fluid in the first flow path. A second one of the flow paths communicates with the first flow path and receives fire suppressant fluid from the first flow path to be discharged to a discharge location.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
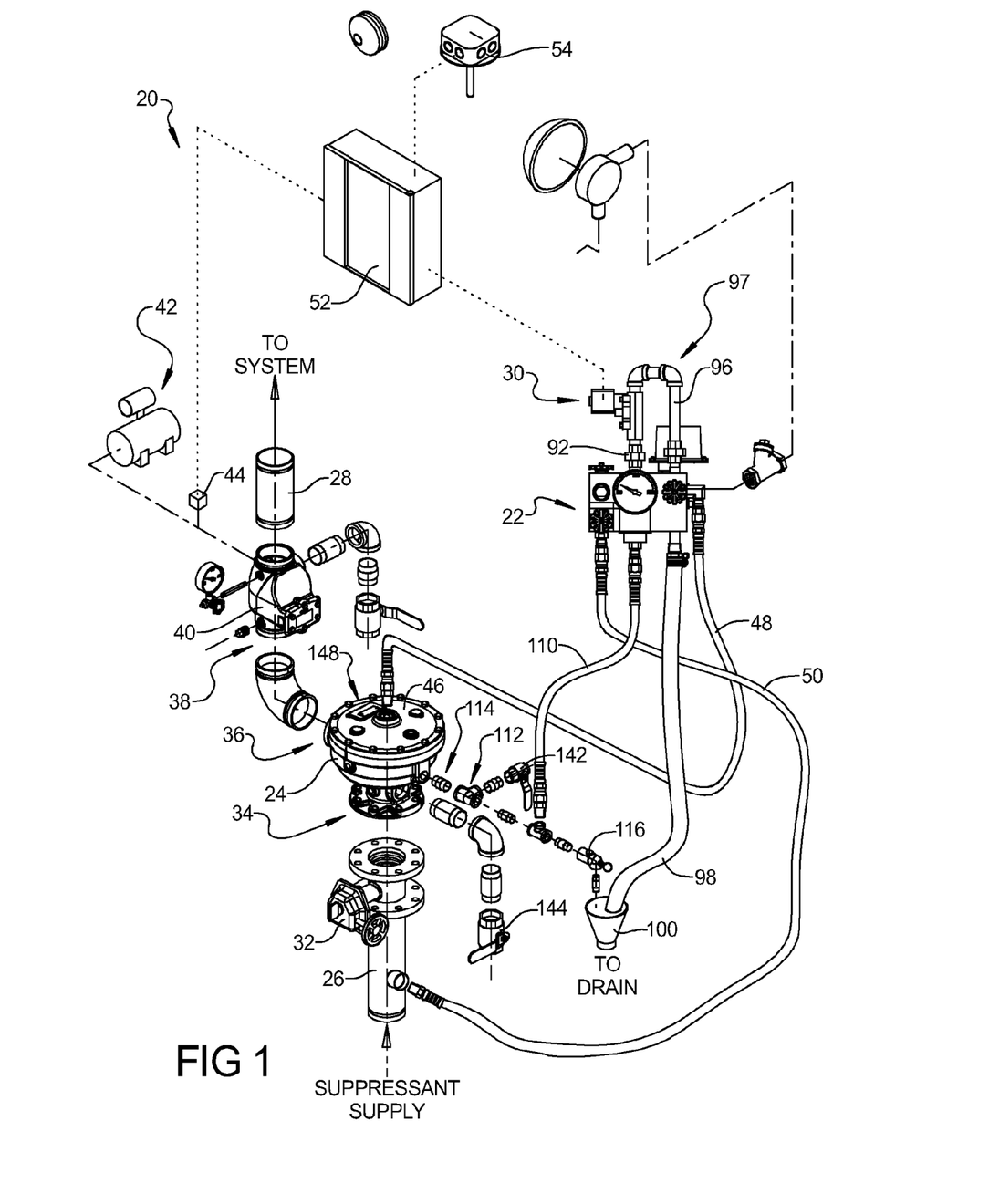
FIG. 1 is an exploded view of a portion of an exemplary pre-action deluge fire protection system utilizing the trim manifold assembly of the present invention.
Figure 2:
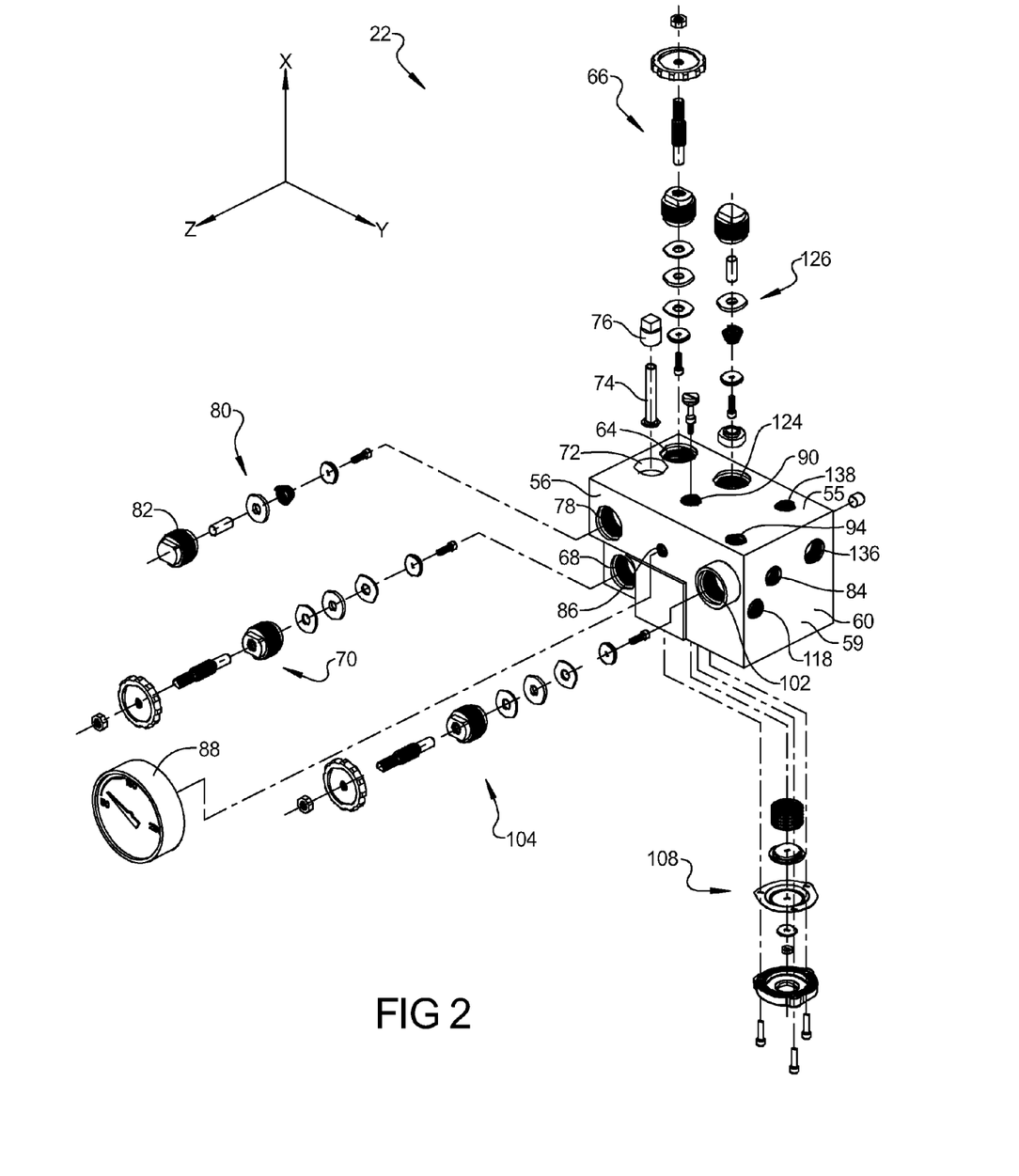
FIG. 2 is an exploded view of the trim manifold assembly of FIG. 1.
Figure 3:
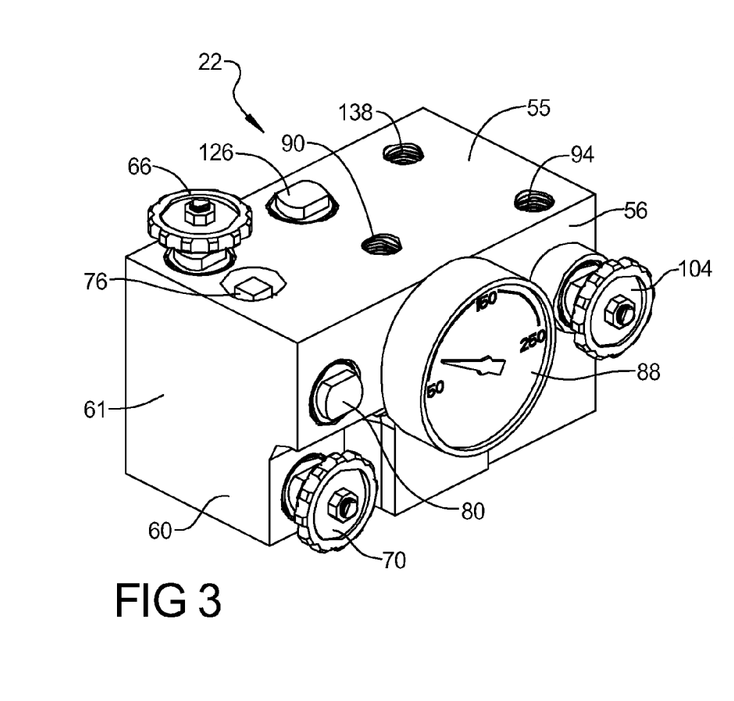
FIGS. 3 and 4 are perspective views of the trim manifold assembly of FIG. 1.
Figure 4:
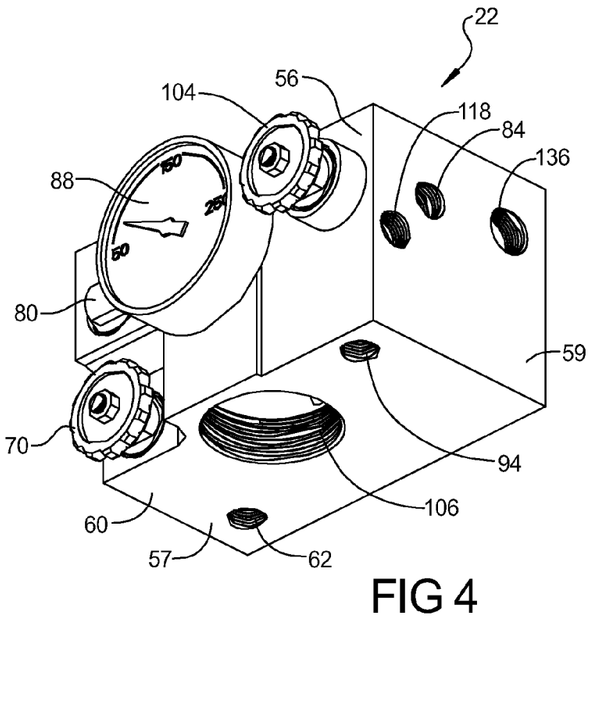
Figure 5:
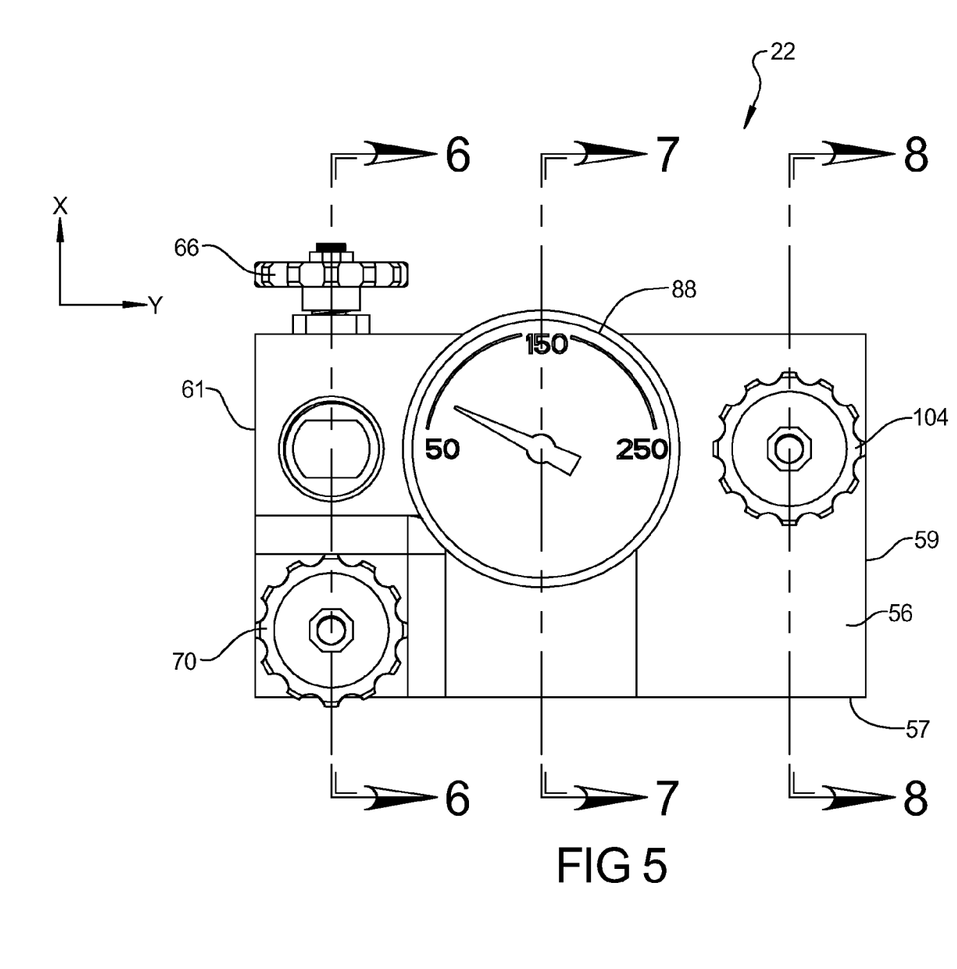
FIG. 5 is a front plan view of the trim manifold assembly of FIG. 1.

Example embodiments will now be described more fully with reference to the accompanying drawings. As used herein, the terms "top," "bottom," "right side," "left side," "front side," and "back side" refer to the orientation of the trim manifold assembly as shown in FIGS. 1-2. It should be appreciated that these terms are relative terms and that these terms are not absolute indications of the orientation of the trim manifold assembly and, rather, are merely exemplary and for purposes of description. Furthermore, it should also be understood that as used herein, the terms "normally open" and "normally closed" refer to the operational condition of the associated component when the trim manifold assembly and the fire protection system are in a ready or set condition for normal operation to activate in the event of a fire condition.

With reference to FIG. 1, a fire protection system, generally indicated at 20, incorporating a trim manifold assembly 22 of the present teachings is shown. In the illustrated embodiment, fire protection system 20 is a pre-action deluge system. It should be appreciated that a trim manifold assembly according to the present teachings may be used in other types of fire protection systems, as described below. Fire protection system 20 includes a control valve 24, which is normally closed and controls the flow of fire suppressant, such as water, from a fire suppressant supply 26 to sprinkler system piping 28, which includes a plurality of sprinklers for delivering the fire suppressant to an area protected by fire protection system 20. As will be more fully described below, trim manifold assembly 22 controls the flow of fire suppressant through valve 24 using a release mechanism 30, which is normally closed and which may be electric, pneumatic, or hydraulic, by way of non-limiting example. Furthermore, trim manifold assembly 22 may provide a compact assembly that is pre-assembled and may be pre-tested prior to installation to ease the assembly of fire protection system 20.

Fire suppressant supply 26 delivers fire suppressant to valve 24 through a supply control valve 32, which is normally open and whose output delivers fire suppressant to the input 34 of valve 24. Output 36 of valve 24 delivers fire suppressant to the input 38 of a check valve 40, whose output delivers fire suppressant to sprinkler system piping 28. Check valve 40 is provided to prevent the pressurized supervisory air in sprinkler system piping 28 entering valve 24. Sprinkler system piping 28 is supervised with pressurized air from air system 42, which is used to monitor the pressure in fire protection system 20 to monitor the integrity of the sprinkler system piping 28 and its components. In the illustrated embodiment, air system 42 delivers pressurized air to sprinkler system piping 28 and may monitor the changes in pressure in sprinkler system piping 28 with one or more pressure switches 44.

In the illustrated embodiment, valve 24 comprises a deluge valve, which includes a priming chamber 46, as is known in the art. Trim manifold assembly 22 controls the pressure in priming chamber 46 and communicates with valve 24 and fire suppressant supply 26 through conduits 48, 50, respectively. Conduits 48, 50, by way of non-limiting example, may be flex hoses. Trim manifold assembly 22 also communicates with a control panel 52 (via wiring indicated by dotted lines in FIG. 1), which provides actuating signals to or monitors signals from components within trim manifold assembly 22 and also components located exteriorly of trim manifold assembly 22 to control the opening of valve 24 in response to low-pressure signals from pressure switch 44 and in response to fire-condition signals from detector 54. Detector 54, by way of non-limiting example, may be a heat detector or, alternatively, a smoke detector.

Referring to FIGS. 2-12, details of trim manifold assembly 22 are shown. Trim manifold assembly 22 may include a solid one-piece manifold 60 with a plurality of fluid passages therein to allow trim manifold assembly 22 to control the operation of valve 24, as described below. Manifold 60 may be metal and the passages therein may be formed by machining the passages into a solid manifold block.

Figure 6:
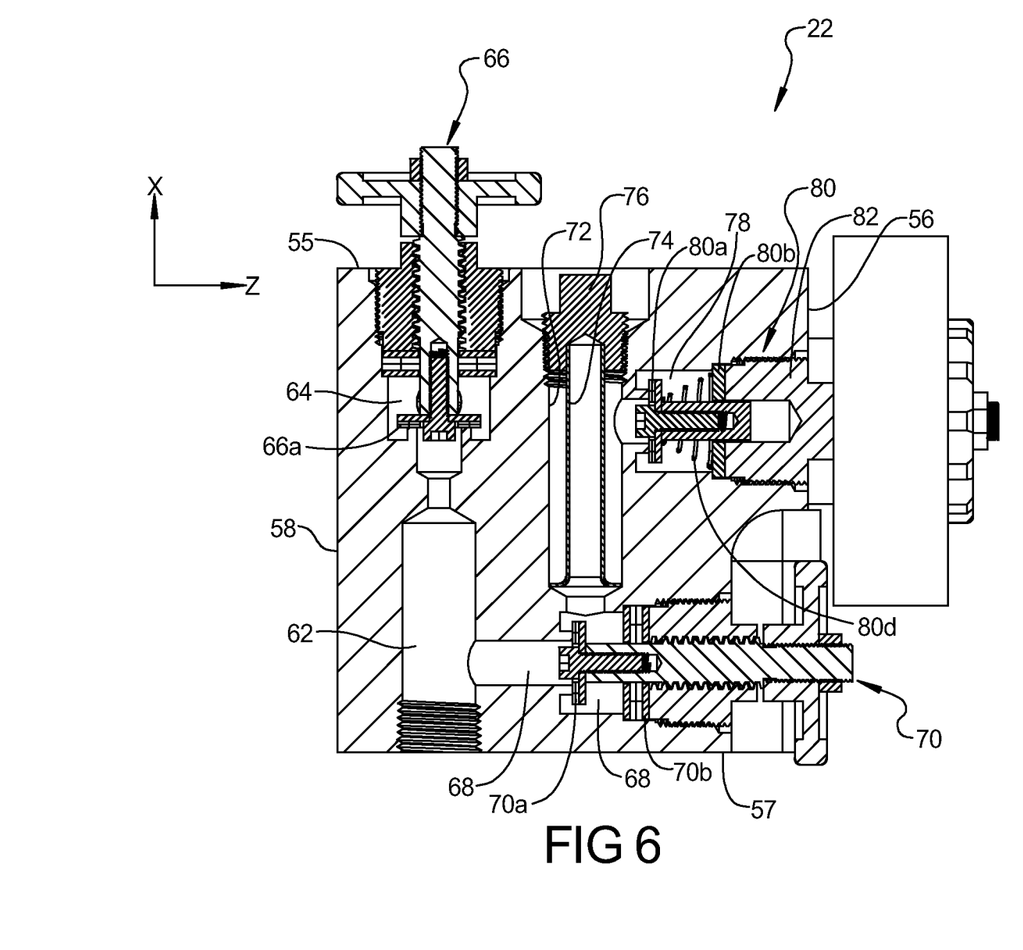
FIGS. 6-8 are cross-sectional views along lines 6-6, 7-7, and 8-8, respectively, of FIG. 5.
Figure 12:
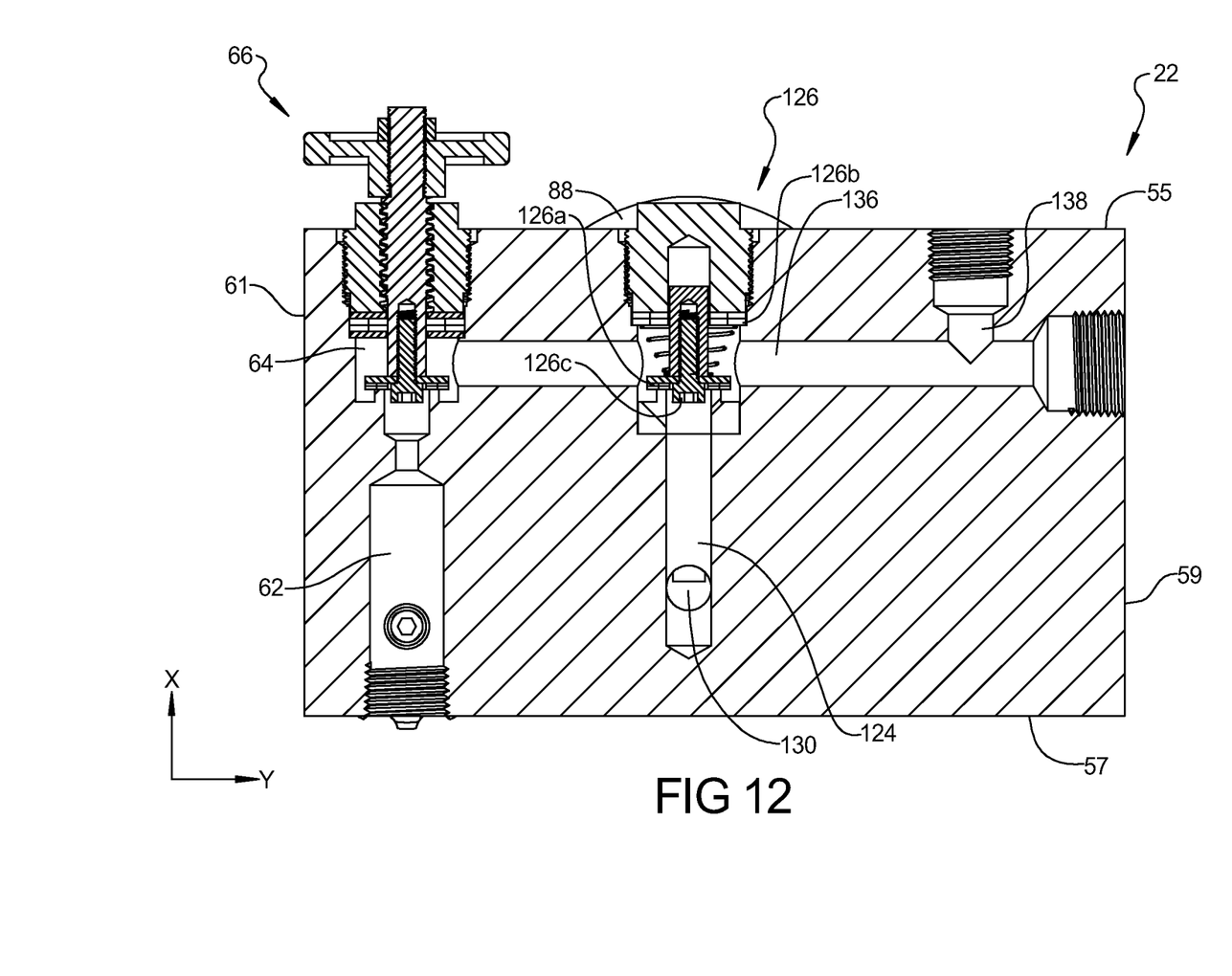
Figure 13:
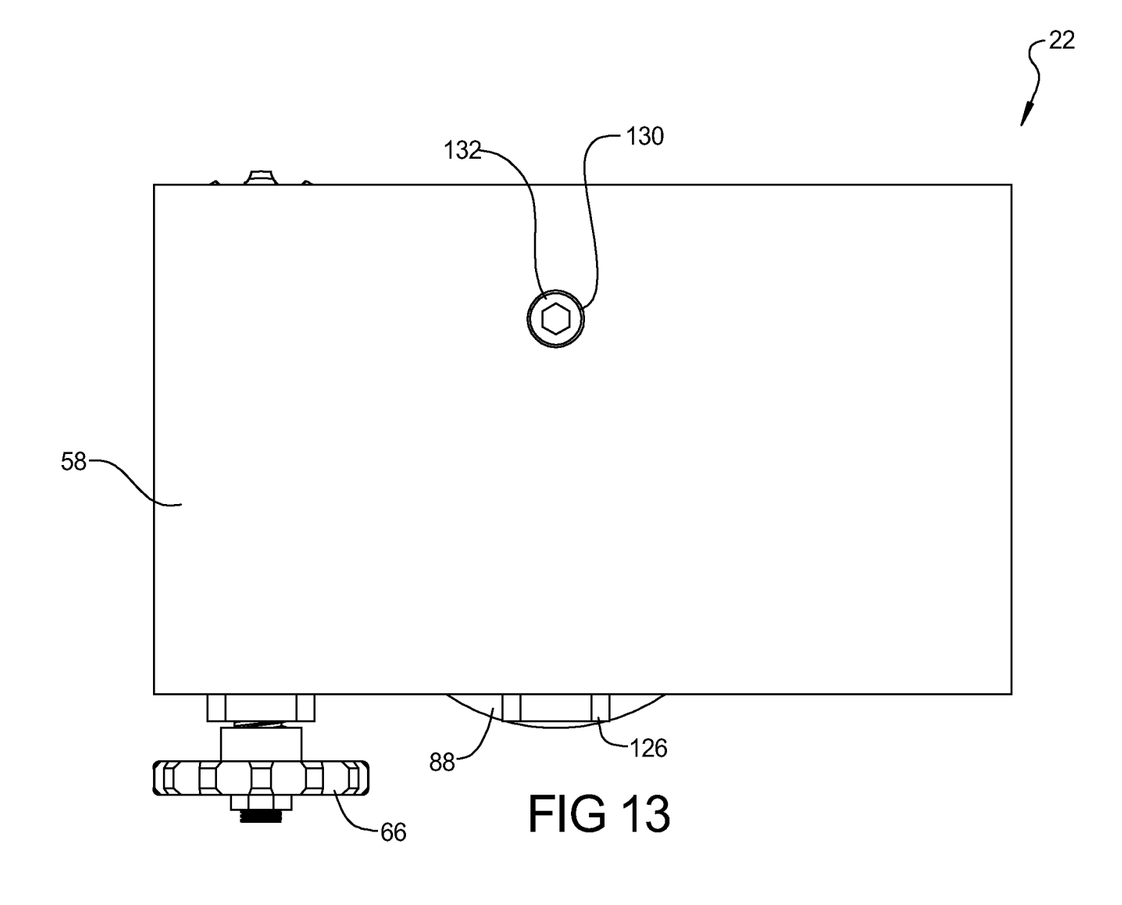
FIG. 13 is a back plan view of the trim manifold assembly of FIG. 1.

Manifold 60 may have a top surface 55, a front surface 56, a bottom surface 57, a back surface 58, a right side surface 59, and a left side surface 61. Manifold 60 includes a prime input passage 62 that extends from bottom surface 57 into manifold 60 along the X axis. An alarm test valve passage 64 also extends along the X axis into manifold 60 from top surface 55 and is aligned with and connected to prime input passage 62, as seen in FIGS. 6 and 12. Conduit 50 is connected to prime input passage 62 while an alarm test valve assembly 66, which is normally closed, is located in alarm test valve passage 64. A prime-line shut-off valve passage 68 extends along the Z axis within manifold 60 from front surface 56 and intersects prime input passage 62, as shown in FIG. 6. A prime-line shut-off valve assembly 70, which is normally open, is disposed in passage 68. A prime-line strainer passage 72, as shown in FIG. 6, extends along the X axis from top surface 55 into manifold 60 and intersects passage 68 between seat seal 70a and stem seal 70b of prime-line shut-off valve assembly 70. A strainer 74 is disposed in passage 72 and retained with a plug 76. A prime-line check valve passage 78 extends along the Z axis from front surface 56 into manifold 60 and intersects passage 72. A check valve assembly 80 is disposed in check valve passage 78 and retained by a plug 82.

Figure 7:
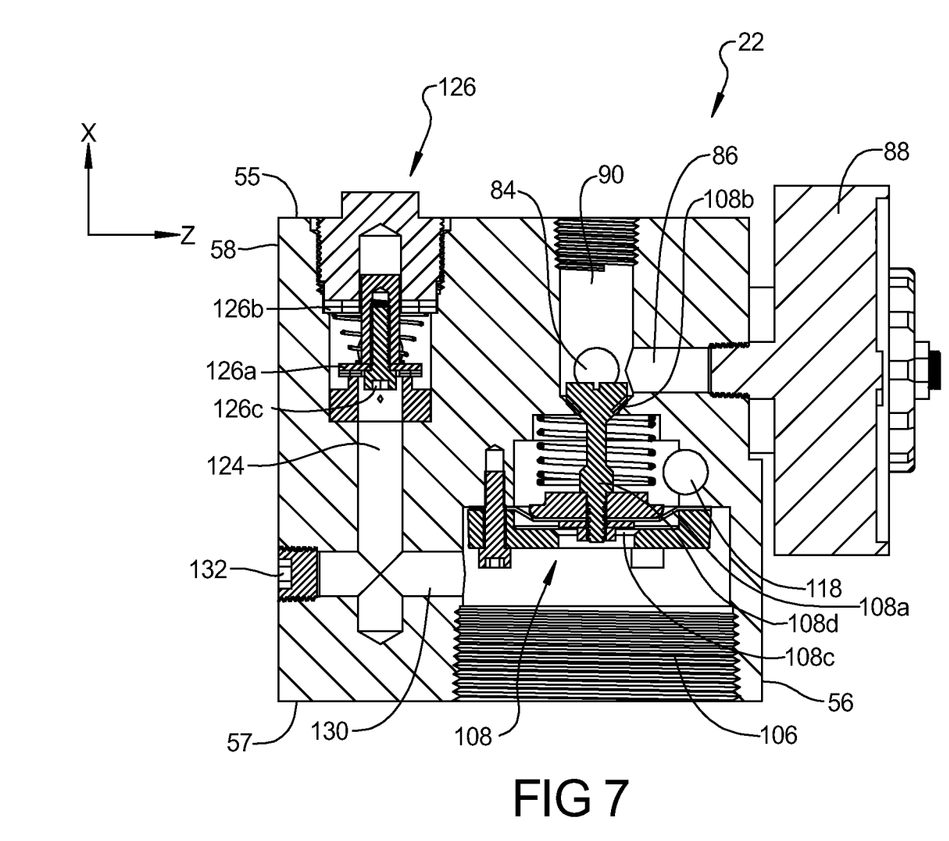
Figure 11:
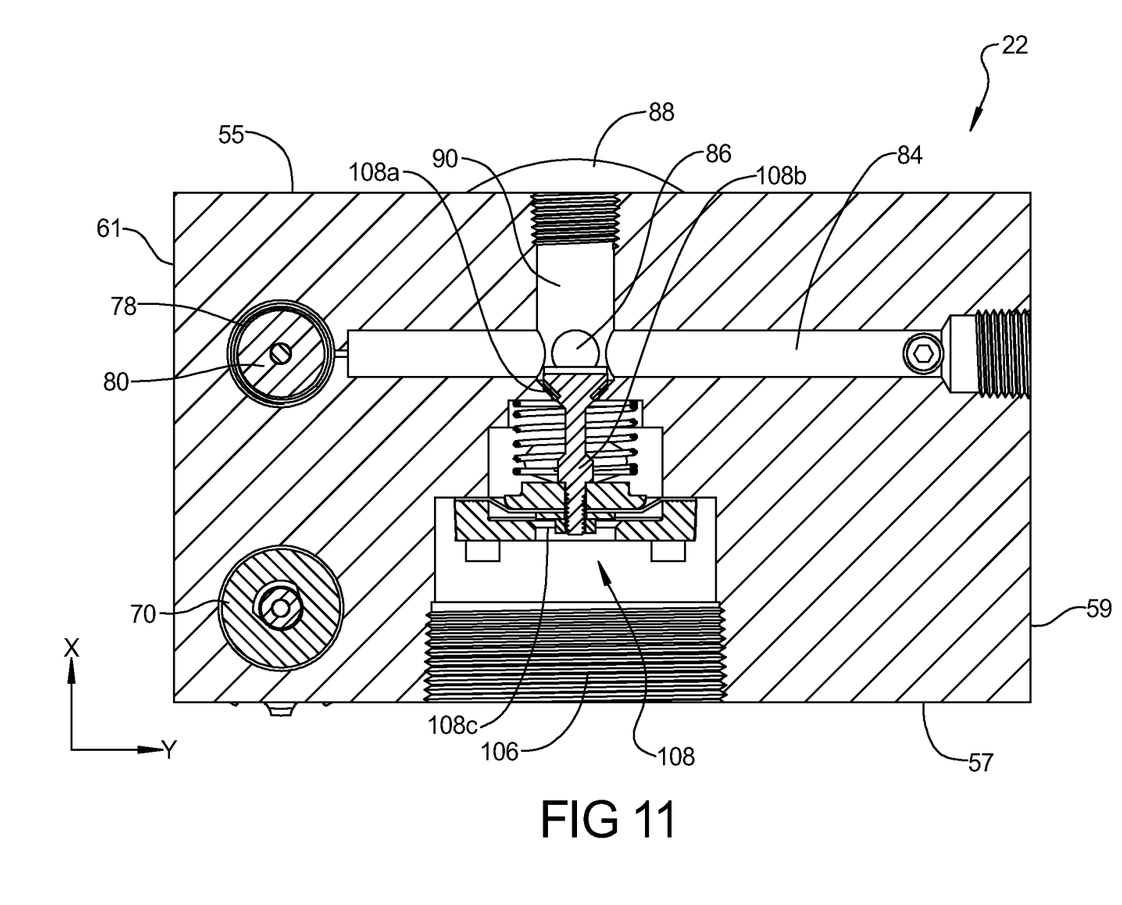

A prime-line output passage 84 extends along the Y axis from right side surface 59 into manifold 60 and intersects prime-line check valve passage 78, as shown in FIG. 11. Conduit 48 is attached to prime-line output passage 84 on right side surface 59 of manifold 60. A gage passage 86 extends along the Z axis from front surface 56 into manifold 60 and intersects passage 84, as shown in FIG. 7. A pressure gage 88 is disposed in gage passage 86 and indicates the fluid pressure in passage 84. A release passage 90 extends along the X axis from top surface 55 into manifold 60 and intersects prime-line output passage 84, as shown in FIGS. 7 and 11. Release mechanism 30 is coupled to release passage 90 by conduit 92, as shown in FIG. 1.

Figure 8:
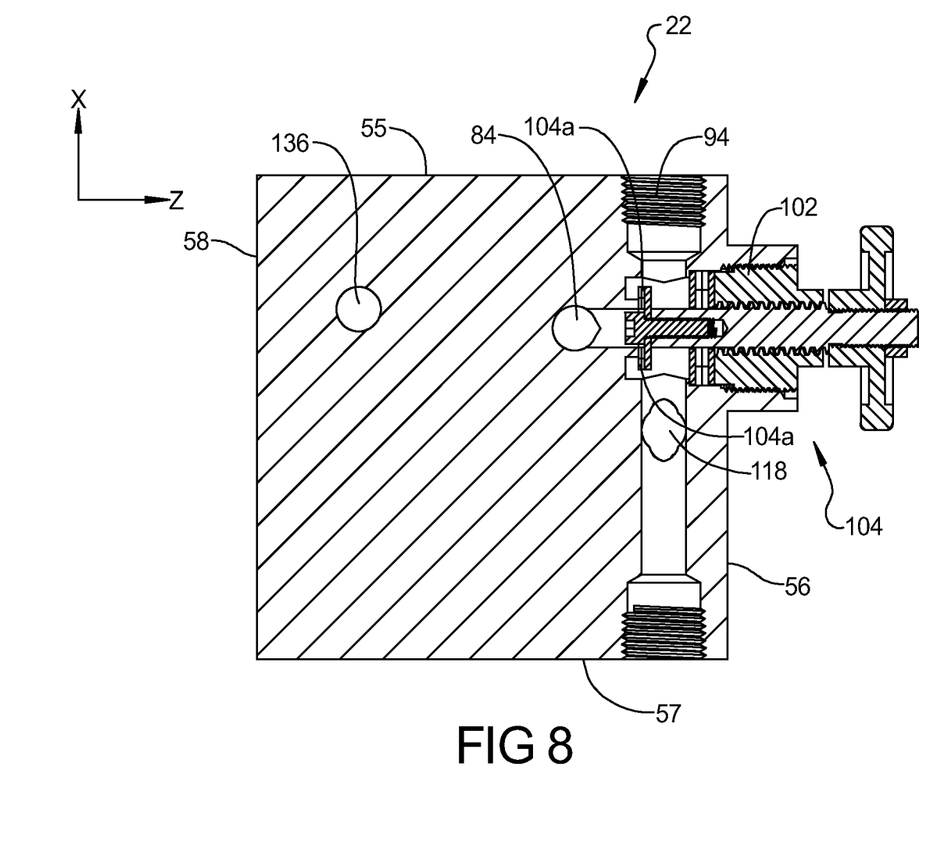
Figure 9:
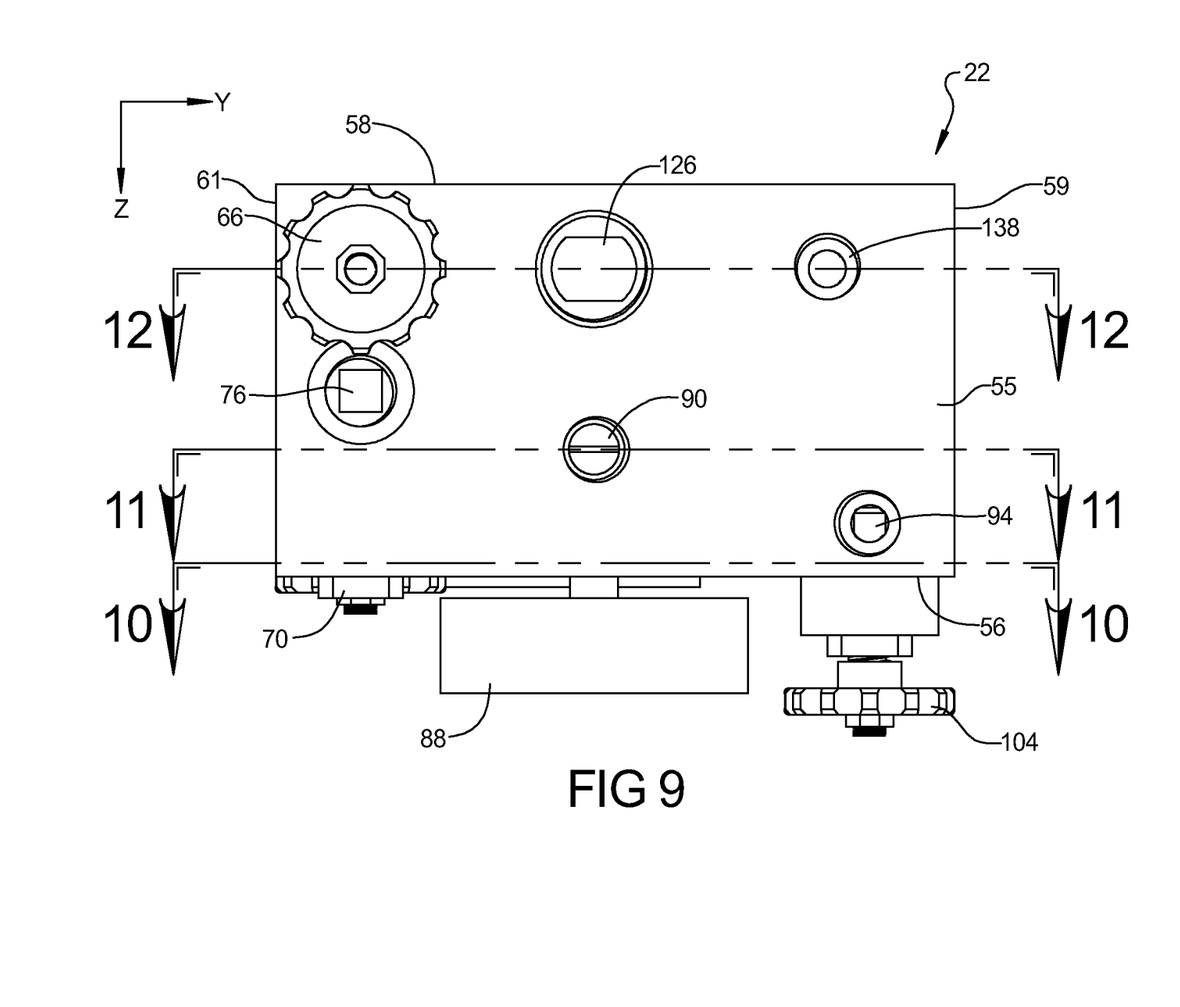
FIG. 9 is a top plan view of the trim manifold assembly of FIG. 1.
Figure 10:
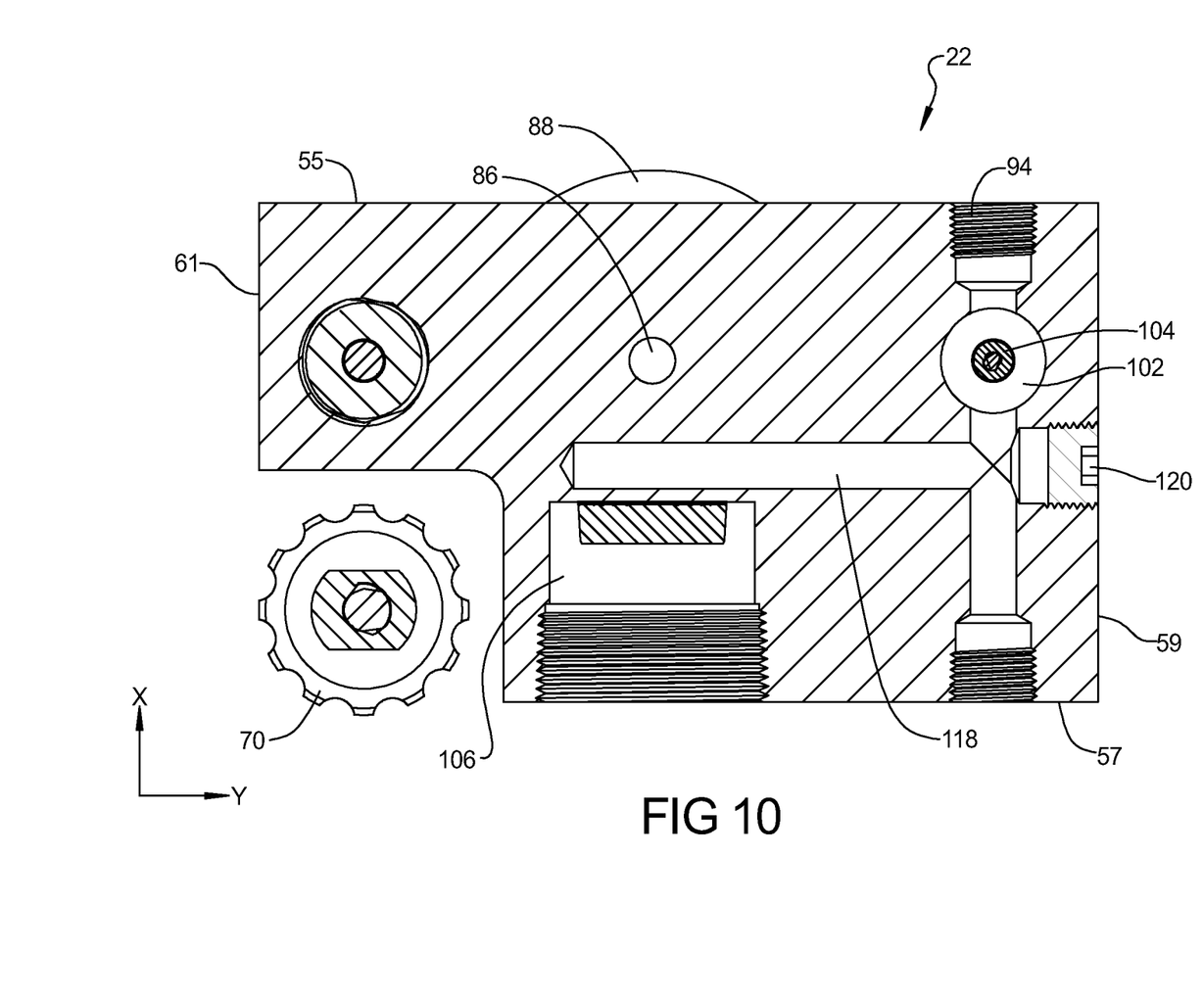
FIGS. 10-12 are cross-sectional views along lines 10-10, 11-11, and 12-12, respectively, of FIG. 9.

A drain passage 94 extends along the X axis from top surface 55 through manifold 60 and out bottom surface 57, as shown in FIGS. 8 and 10. A conduit 96 extends from release mechanism 30 to drain passage 94 on top surface 55, as shown in FIG. 1. Conduits 92, 96 and release mechanism 30 may collectively be referred to as a release line assembly 97. A conduit 98 extends from drain passage 94 at bottom surface 57 of manifold 60 to an open drain 100, also as shown in FIG. 1. Conduit 98 may be a flex hose. An emergency relief passage 102 extends along the Z axis from front surface 56 into manifold 60 and intersects passageways 94 and 84, as shown in FIG. 8. An emergency relief valve assembly 104, which is normally closed, is disposed in passage 102.

A pressure operating relief valve (PORV) passage 106 extends along the X axis from bottom surface 57 into manifold 60 and intersects release passage 90, as shown in FIGS. 7 and 11. PORV passage 106 and release passage 90 may be coaxial. A pressure operated relief valve (PORV) 108, which is normally closed, is disposed in PORV passage 106. A conduit 110 extends from PORV passage 106 at bottom surface 57 of manifold 60 to another conduit 112 which is in fluid communication with an intermediate chamber 114 of valve 24, as shown in FIG. 1. Conduit 110 may be a flex hose. Conduit 112 also communicates with open drain 100 through a drip check valve 116.

A PORV drain passage 118 extends along the Y axis from right side surface 59 into manifold 60 and intersects both drain passage 94 and PORV passage 106, as shown in FIGS. 7, 8, and 10. A plug 120 is disposed in the end of PORV drain passage 118 adjacent right side surface 59. A drain check valve passage 124 extends along the X axis from top surface 55 into manifold 60, as shown in FIGS. 7 and 12. A drain check valve assembly 126 is disposed in drain check valve passage 124. A connecting passage 130 extends along the Z axis from back surface 58 into manifold 60 and interconnects drain check valve passage 124 with PORV passage 106 below PORV 108, as shown in FIGS. 7 and 12. A plug 132 is disposed in connecting passage 130 adjacent back surface 58.

A first alarm passage 136 extends along the Y axis from right side surface 59 into manifold 60 and intersects with drain check valve passage 124 and alarm test valve passage 64, as shown in FIGS. 8 and 12. A second alarm passage 138 extends along the X axis from top surface 55 into manifold 60 and intersects first alarm passage 136. First and second alarm passages 136, 138 may be connected to alarms for fire protection system 20. The alarms may be operable to detect a pressure within first and second alarm passages 136, 138 which may be indicative of operation of control valve 24 due to a fire condition.

Referring again to FIG. 1, fire protection system 20 may also include an auxiliary drain valve 142 which is coupled to conduit 112. Auxiliary drain valve 142 is normally closed and may be manually operated to drain fire suppressant from intermediate chamber 114 of valve 24. A flow test valve 144 may be coupled to the input 34 of valve 24. Flow test valve 144 is normally closed and may be opened to verify the flow of fire suppressant to valve 24.

Referring now to FIGS. 1-2, 6-8, and 10-12, operation of trim manifold assembly 22 and fire protection system 20 will be described. To place trim manifold assembly 22 in a ready or operational mode, the fire suppressant from fire suppressant supply 26 flows, via conduit 50, into prime input passage 62 and flows through the various passages that are in flow communication therewith the various valves in their normal operating position (i.e., either normally open or normally closed, as described above). This fire suppressant in trim manifold assembly 22 is also referred to as the priming fluid and is at a prime pressure and is in a closed volume within manifold 60 between the seat seal 66a of alarm test valve assembly 66, the stem seal 70b of prime-line shut-off valve assembly 70, plug 76 in prime-line strainer passage 72, stem seal 80b of check valve assembly 80, prime pressure gage 88, stem seal 108b of PORV 108, seat seal 104a of emergency relief valve assembly 104, release mechanism 30, and priming chamber 46 of valve 24 via conduit 48. Thus, when trim manifold assembly 22 is in the set or ready condition, fire suppressant (priming fluid) at the prime pressure (e.g., the pressure of fire suppressant supply 26) is disposed in a defined closed space within manifold 60, conduits 48, 50 and priming chamber 46 of valve 24. The pressure in priming chamber 46 controls the position of a clapper assembly 148, which opens and closes communication between input 34 and output 36 of valve 24.

Automatic operation of trim manifold assembly 22 is controlled by release mechanism 30. To release the pressure in priming chamber 46 and supply the fire suppressant to sprinkler system piping 28, release mechanism 30, which is normally closed, is activated to open a flow path into conduit 96. As stated above, release mechanism 30 may include one or more actuators, such as an electric, pneumatic, and/or hydraulic actuator, by way of non-limiting example, that can selectively allow flow communication between conduit 92 and conduit 96 and release the prime pressure in (depressurize) priming chamber 46. By way of non-limiting example, when release mechanism 30 includes an electrically actuated actuator, such as a solenoid valve, the actuator may be in communication with control panel 52 and is actuated to open when control panel 52 receives a signal from detector 54, which is actuated in a fire condition, or from sensor 44, which is indicative of a loss of the supervisory pressure in sprinkler system piping 28, such as when a sprinkler has opened.

A pneumatic actuator, by way of non-limiting example, can be included in release mechanism 30 and may be responsive to the pressure in sprinkler system piping 28. In particular, the pneumatic actuator is normally closed but is opened when the sensing side of the actuator detects a drop in pressure in sprinkler system piping 28. In a fire condition, when a sprinkler opens, the supervisory pressure in sprinkler system piping 28 is reduced, causing the pneumatic actuator to open.

In some embodiments, there may be multiple actuators in series arrangement that form release mechanism 30 and release line assembly 97. In these embodiments, multiple conditions may be required to occur in order to provide flow communication between conduits 92, 96 and release the prime pressure in priming chamber 46. In one dual actuator arrangement, when control panel 52 receives a signal from detector 54 of a fire condition and one or more sprinklers open in response to a fire condition, control panel 52 actuates the solenoid valve to open while the pressure drop in sprinkler system piping 28 opens the pneumatic actuator so that the pressure is released from priming chamber 46. The use of multiple actuators in release mechanism 30 can provide a double interlock system. It should be appreciated that release mechanism 30 can include a variety of different types of actuators and/or a combination of actuators to provide the desired interlocking and releasing of the pressure within priming chamber 46 for fire protection system 20.

When release mechanism 30 and the actuator therein are opened to allow flow communication between conduit 92 and conduit 96, the pressure of the fire suppressant in trim manifold assembly 22 is reduced as the fire suppressant can flow out of trim manifold assembly 22 through release passage 90. The fire suppressant flows from conduit 92 past the actuator of release mechanism 30 and into conduit 96 for travel back into trim manifold assembly 22 through drain passage 94. Within drain passage 94, the fire suppressant flows through trim manifold assembly 22 and exits therefrom through conduit 98 and into open drain 100, thereby being discharged. The reduction of the prime pressure causes the operation of valve 24. Specifically, the reduction in the pressure in priming chamber 46 allows clapper assembly 148 to move, thereby allowing flow communication between input 34 and output 36. As a result, fire suppressant can flow through sprinkler system piping 28.

As valve 24 is caused to operate, the fire suppressant at an intermediate pressure in intermediate chamber 114 enters PORV passage 106 of manifold 60 through conduit 110. The fire suppressant enters connecting passage 130 and drain check valve passage 124. The fire suppressant overcomes the biasing closed force and travels through drain check valve assembly 126 and enters first and second alarm passages 136, 138, wherein the sensors attached thereto can detect the pressure. The fire suppressant also enters a sensing port 108c of PORV 108. The pressure at sensing port 108c causes PORV stem 108d to move, thus breaking the PORV stem seal 108b and seat seal 108a. The effect of the operation of PORV 108 will prevent accumulation of fire suppressant and pressure buildup in release passage 90 in the case that the actuator of release mechanism 30 ceases to operate (i.e., closes). If the actuator of release mechanism 30 ceases to operate, the fire suppressant will drain (discharge) through release passage 90, past PORV stem seal 108b, through PORV drain passage 118, out of manifold 60 through drain passage 94, and into conduit 98 through open drain 100.

Thus, when the pressure in priming chamber 46 is released (depressurized), the flow of fire suppressant from fire suppressant supply 26 to sprinkler system piping 28 occurs and PORV 108 in conjunction with trim manifold assembly 22 prevents an increase in pressure in priming chamber 46 even in the event that release mechanism 30 were to reset and close flow communication between conduits 92 and 96.

In order to reset trim manifold assembly 22 to working condition, the pressure at PORV passage 106 must be removed so that PORV 108 can return to its normally closed state. The pressure in PORV passage 106 can be removed by closing supply control valve 32 and draining the fire suppressant liquid from the system.

Trim manifold assembly 22 may be manually operated as opposed to automatic actuation, discussed above. The manual operation varies from the automatic operation only in the terms of the initiation of the operation. In the manual operation, the operator opens emergency relief valve assembly 104, which reduces the fire suppressant pressure from prime input passage 62 and prime-line output passage 84. In particular, the opening of emergency relief valve assembly 104 allows the fire suppressant to be discharged through drain passage 94 to open drain 100 via conduit 98, thereby relieving the pressure. This begins the remaining operation of trim manifold assembly 22, as described above. Accordingly, further description of the operation of trim manifold assembly 22, when manually operated, is not discussed further.

Trim manifold assembly 22 allows for the pressure alarms coupled to first and second alarm passages 136, 138 to be tested without activating valve 24. Alarm test valve assembly 66 can be opened, which results in fire suppressant in prime input passage 62 flowing past seat seal 66a and into alarm test valve passage 64. The fire suppressant will then enter drain check valve assembly 126 between seat seal 126a and stem seal 126b. This traps the pressure in this chamber and thus prevents the operation of PORV 108. The fire suppressant travels through drain check valve assembly 126 to first and second alarm passages 136, 138. The alarm sensors coupled to first and second alarm passages 136, 138 can detect the pressure in those passages. When the alarm pressure is verified, alarm test valve assembly 66 can be closed. The fire suppressant that is in first and second alarm passages 136, 138 and in drain check valve assembly 126 will then drain through an orifice 126c in drain check valve assembly 126, through drain check valve passage 124, connecting passage 130 and PORV passage 106, as shown in FIGS. 7 and 12. The fire suppressant will continue to drain through conduit 110 and through drip check valve 116 into open drain 100, as shown in FIG. 1. Thus, trim manifold assembly 22 allows for the pressure alarms to be tested without activating valve 24 and PORV 108.

Check valve assembly 80 in prime-line check valve passage 78 can protect the prime pressure in priming chamber 46 of valve 24 from being reduced as a result of varying supply pressures of the fire suppressant and/or operation of alarm test valve assembly 66. In particular, as fire protection system 20 is being put into an operating condition, prime-line check valve assembly 80 lets the fire suppressant go past seat seal 80a as the pressure overcomes the force of the biasing spring 80d. Once the prime pressure in prime-line check valve assembly 80 reaches its set pressure, spring 80d causes seat seal 80a to close and, as a result, retain the pressure in prime-line check valve passage 78. By retaining the pressure in prime-line check valve passage 78, prime-line check valve assembly 80 protects the pressure in priming chamber 46 of valve 24 from being subjected to varying pressures as a result of potentially varying supply pressure of the fire suppressant. Additionally, this also protects priming chamber 46 from being subjected to varying pressures as a result of operation of alarm test valve assembly 66.

Drain check valve assembly 126 is configured to allow the pressure in first and second alarm passages 136, 138 to be drained through PORV passage 106 while not causing the operation of PORV 108. In particular, when alarm test valve assembly 66 is opened, fire suppressant from prime input passage 62 flows through manifold 60 to the port between seat seal 126a and stem seal 126b. The fire suppressant pressure is checked from PORV sensing port 108c by drain check valve assembly 126 which is a drip check valve. Drain port (orifice) 126c of drain check valve assembly 126 is sized such that it is sufficient to drain the pressure from first and second alarm passages 136, 138 through PORV passage 106 while not causing the operation of PORV 108. Drain check valve assembly 126 allows the fire suppressant to flow into first and second alarm passages 136, 138 at a first flow rate while also allowing fire suppressant to flow out of first and second alarm passages 136, 138 through drain port 126c at a second flow rate substantially less than the first flow rate. This prevents operation of PORV 108 and thus operation of fire protection system 20 when testing the pressure alarms.

It should be appreciated that drip check valve 116 works in conjunction with trim manifold assembly 22 to facilitate the reducing of pressure from first and second alarm passages 136, 138 and allow the testing of the pressure sensors coupled thereto. Furthermore, valve 24 includes an intermediate chamber 114 that is pressurized only upon activation of valve 24 through trim manifold assembly 22 and the release of the pressure from priming chamber 46. Additionally, supply control valve 32 may be closed to allow trim manifold assembly 22 and fire protection system 20 to be setup and also to shutdown the operation of trim manifold assembly 22 and fire protection system 20. Auxiliary drain valve 142, while having no interdependence on trim manifold assembly 22, can be utilized to restore fire protection system 20 and trim manifold assembly 22 to its original operating condition by relieving pressure from PORV passage 106 and intermediate chamber 114.

Trim manifold assembly 22 according to the present invention can be used with other types of control valves 24. For example, trim manifold assembly 22 can be used with a control valve that utilizes a different type of fluid pressure activated device, such as a side differential valve instead of the priming chamber. In such an application, a side differential valve is operable to maintain the clapper (or other flow communication device within control valve 24) in a closed position, thereby preventing flow of fire suppressant from fire suppressant supply 26 to sprinkler system piping 28. The side differential valve may communicate with the trim manifold assembly 22 such that when a fire condition is detected, trim manifold assembly 22 can utilize release line assembly 97 to release pressure (depressurize the priming fluid) in the side differential valve. Releasing the pressure in the side differential valve can thereby activate the control valve, allowing flow communication between input 38 and output 36, and allowing fire suppressant fluid to flow to sprinkler system piping 28 from fire suppressant supply 26 by activation of release mechanism 30. As a result, fire suppressant can flow through sprinkler system piping 28. The activation of the control valve can cause fire suppressant at an intermediate pressure from an intermediate pressure chamber 114 to enter PORV passage 106 and manifold 60 through conduit 110. This intermediate pressure fluid can enter into first and second alarm passages 136, 138, wherein the sensors attached thereto can detect the pressure, as described above. Furthermore, the fire suppressant at the intermediate pressure can also be present at pressure sensing port 108*c* causing PORV stem 108*d* to move, thus breaking the PORV stem seal 108*b* and seat seal 108*a*, as discussed above. Thus, when the pressure in the side differential valve is released (de-pressurized), the flow of fire suppressant from fire suppressant supply 26 to sprinkler system piping 28 occurs and PORV 108 in conjunction with trim manifold assembly 22 prevents an increase in pressure in the side differential valve, even in the event that release mechanism 30 were to reset and close flow communication between conduits 92 and 96.

The use of a side differential valve may allow for different pressure differentials to be utilized that may allow for smaller sizes of the component devices for a given flow rate and/or quicker reaction. For example, the side differential valve may have a differential of 4.5 to 1 as compared to a differential of a control valve having a priming chamber which may be 1.1 to 1, by way of non-limiting example.

A trim manifold assembly according to the present invention may also be utilized in other types of fire protection systems, such as dry systems, wet valve systems, and deluge systems. The specific flow passages in communication within trim manifold assembly 22 can vary depending upon the needs to activate the control valve associated with these different fire protection systems. It should be appreciated that in these varying applications, the configuration of the release line assembly 97 can vary depending upon the needs of the system.

In some embodiments, release line assembly 97 may be in the form of another manifold assembly that can be coupled to trim manifold assembly 22. In this manner, trim manifold assembly 22 may be utilized for a variety of different applications while the release line assembly manifold configured for a specific application can be utilized with trim manifold assembly 22 to meet the needs of the fire protection system. For example, when the release line assembly is provided as an integral manifold, one or more release mechanisms 30 can be incorporated therein to provide the desired functionality, such as a single interlocked, a double interlocked and the like, as discussed above, by way of non-limiting example. The release line assembly manifolds can all be configured to be coupled to release passage 90 and drain passage 94. In this manner, the trim manifold assembly 22 may be a universal trim manifold assembly, while a specific release line assembly manifold is utilized to meet the particular design requirements for the fire protection system. Use of a release line assembly manifold in conjunction with trim manifold assembly 22 can facilitate the interconnection thereof, while diminishing the possibility of inadvertent connections or incorrect installation. Moreover, by utilizing a universal trim manifold assembly 22, less parts may be required to be stocked by suppliers of the components as trim manifold assembly 22 can be utilized with a variety of different fire protection systems and the release line assembly manifold chosen for the particular application.

While the present invention has been described with reference to specific embodiments, illustrations, and descriptions of same, it should be appreciated that the foregoing is not intended to be exhaustive or to limit the invention. The various features and/or configurations can be altered from that shown while still providing the described functionality. For example, the passageways, while being described as extending along either the X, Y, or Z axis, can extend in other orientations different than those shown and described. Additionally, the various valve assemblies may come in different configurations that provide the described functionality and various flow communications between the various passages depending upon differing operating conditions.

Moreover, while the trim manifold assembly 22 is shown and described as being a single solid member with the flow paths formed from one or more straight passages machined therein, it should be appreciated that the trim manifold assembly 22 may be formed from a variety of pieces that are assembled together to have the desired flow paths therethrough. Additionally, the flow paths may be configured in orientations other than straight. By way of non-limiting example, one or more components of the trim manifold assembly may be molded or cast and the associated passages therein cast or molded into the associated member. As such, the passages may take on configurations other than being straight, such as being curved. Furthermore, it should be appreciated that while the present invention has been described as reference to specific embodiments, illustrations, and descriptions of same, other features and components that may be present and utilized, such as strainers, restricted prime orifice, serviceable strainer, or gauge, by way of non-limiting example. As such, the trim manifold assembly may include other features and components, such as those mentioned.

Accordingly, the foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A fire protection system comprising:
   a fire suppressant fluid supply;
   sprinkler system piping;
   a fire protection system control valve having an inlet in communication with said fire suppressant fluid supply line and an outlet in communication with said sprinkler system piping, said fire protection system control valve including a priming chamber and an intermediate chamber; and
   a trim manifold assembly comprising:
      a manifold block;
      a prime line input passage in said manifold block connected to and receiving fire suppressant fluid from the fire suppressant fluid supply upstream of the fire protection system control valve;
      a path line output passage in said manifold block and in communication with the prime line input passage, said prime line output passage being connected to said priming chamber of said fire protection system control valve;
      a prime line shut-off valve disposed in said manifold block and in communication with said prime line input passage;
      a pressure operating relief valve passage in said manifold block and communicating with said intermediate chamber of said fire protection system control valve; and
      a pressure operating relief valve in said pressure operating relief valve passage and responsive to the presence of fire suppressant fluid in said intermediate chamber of said fire protection system control valve, said pressure operating relief valve including a valve portion which closes a passage between said prime line output passage and a drain passage within said manifold block when no fire suppressant fluid is in said intermediate chamber of said fire protection system control valve and opens communication between said prime line output passage and said drain passage when fire suppressant fluid is in said intermediate chamber of said fire protection system control valve, wherein the fire protection system control valve is responsive to a change in fluid pressure in said prime line output passage to control the flow of fire suppressant fluid from the fire suppressant fluid supply line to the sprinkler system piping.

2. The fire protection system of claim 1, further comprising a release line assembly communicating with the prime line output passage and the drain passage and responsive to a fire condition, said release line assembly allowing flow communication between said third and fourth flow paths during a fire condition.

3. The fire protection system of claim 2, wherein said release line assembly is external to said manifold block.

4. The fire protection system of claim 1, wherein said pressure operated release valve includes a pressure sensing port, a seat seal, a stem, and a stem seal, fire suppressant fluid in said pressure operating relief valve passage unsetting said seat seal and said stem seal when said pressure of the fire suppressant fluid in said pressure operating relief valve passage exceeds a predetermined value, unsetting said seat seal and said stem seal allowing flow communication between said prime line output passage and a pressure operating relief valve drain passage extending through said manifold.

5. The fire protection system of claim 4, said pressure operating relief valve drain passage intersecting said drain passage and allowing fire suppressant fluid in said path line output passage to be discharged through said pressure operating relief valve and said drain passage.

6. The fire protection system of claim 1, further comprising a prime line shut off valve in communication with said prime line input passage, said shut off valve selectively stopping all fluid flow through said prime line input passage.

7. The fire protection system of claim 1, further comprising a check valve in said prime line input passage, said check valve allowing one way flow through said prime line input passage and inhibiting pressure fluctuations in the fire suppressant fluid supply line from causing pressure fluctuations in said prime line input passage downstream of said check valve.

8. The fire protection system of claim 1, further comprising:
   an emergency relief passage extending through said manifold block and in communication with said prime line input passage and said drain passage; and
   a manually operated emergency release valve in said emergency relief passage selectively allowing flow communication between said prime line input passage and said drain passage to discharge fire suppressant fluid from said prime line input passage and depressurize said prime chamber.

9. The fire protection system of claim 1, wherein said manifold block is a single solid member and each of said flow paths is formed from one or more passages machined into said single solid member.

* * * * *

UNITED STATES PATENT AND TRADEMARK OFFICE
CERTIFICATE OF CORRECTION

PATENT NO.         : 8,727,029 B2                                            Page 1 of 1
APPLICATION NO.    : 12/556919
DATED              : May 20, 2014
INVENTOR(S)        : Feenstra It is certified that error appears in the above-identified patent and that said Letters Patent is hereby corrected as shown below:

In the Claims

Column 11, claim 1, line 25, delete "path" and insert --prime-- therefor.

Column 12, claim 5, line 23, delete "path" and insert --prime-- therefor.

Signed and Sealed this
Twenty-ninth Day of July, 2014

Michelle K. Lee
*Deputy Director of the United States Patent and Trademark Office*